Dec. 17, 1929.   A. J. LIPPOLD   1,740,186
BOTTLE DECAPPING APPARATUS
Filed Jan. 28, 1928   4 Sheets-Sheet 1
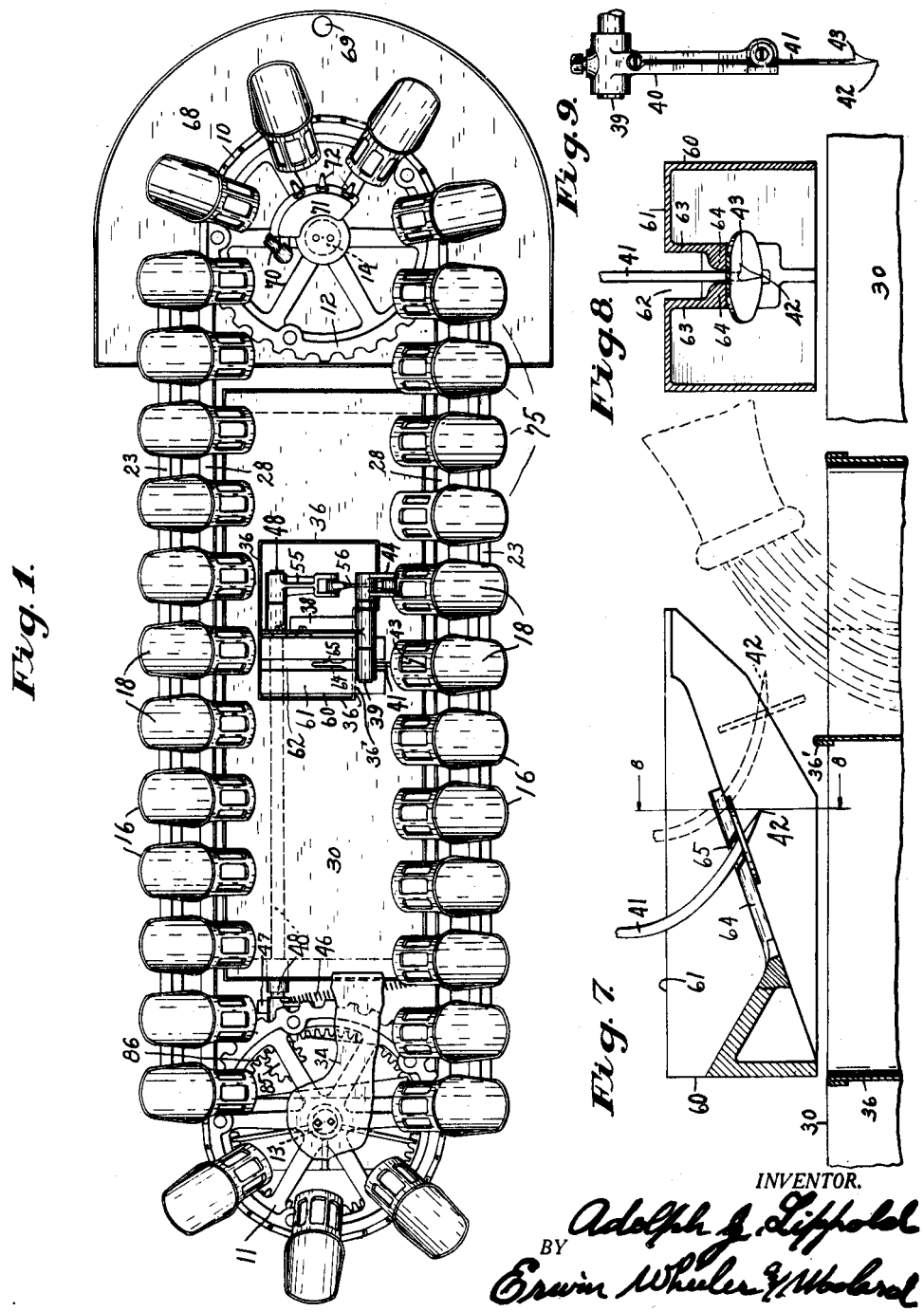
INVENTOR.
Adolph J. Lippold
BY
Erwin Wheeler & Woolard
ATTORNEYS

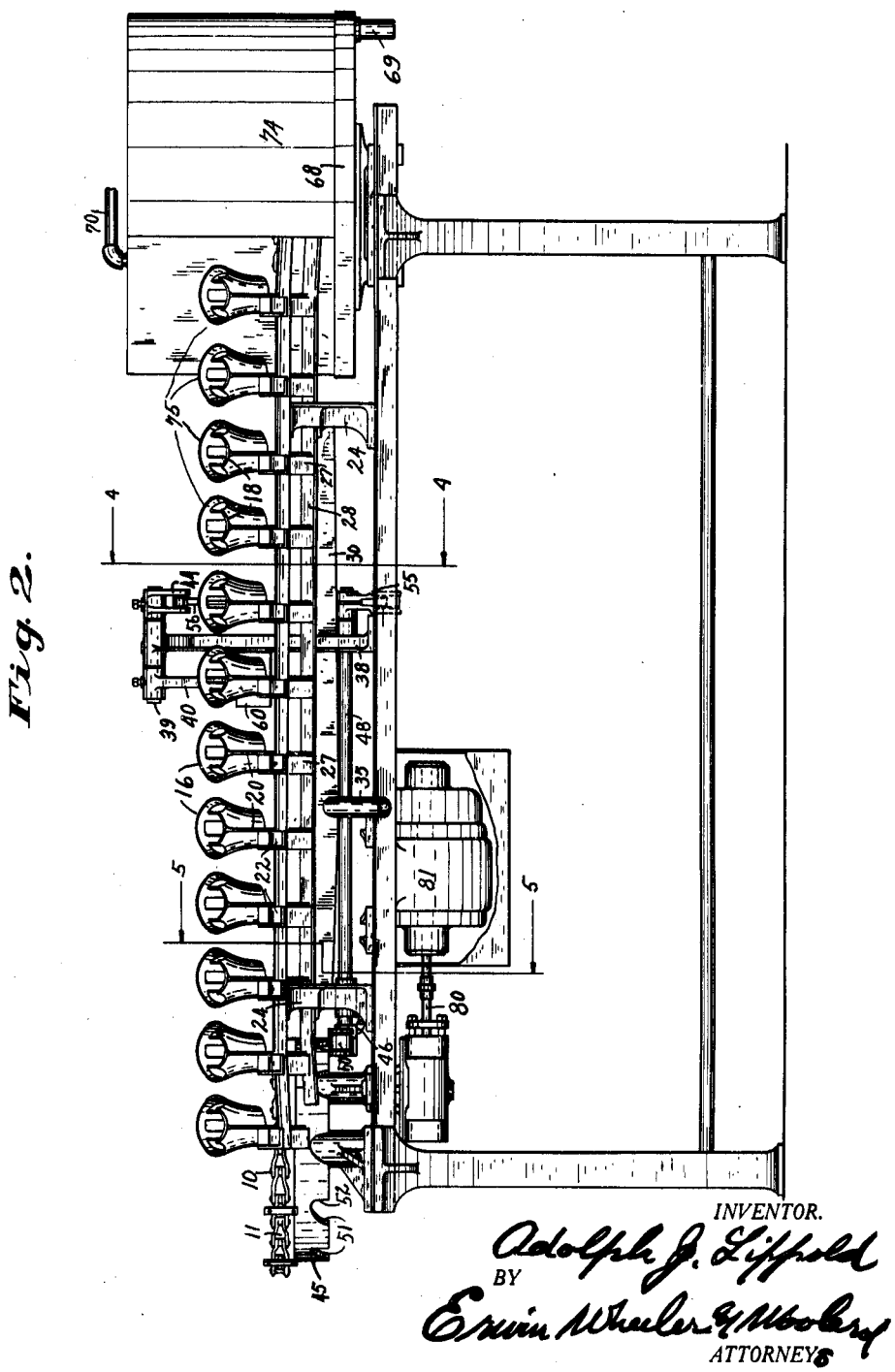

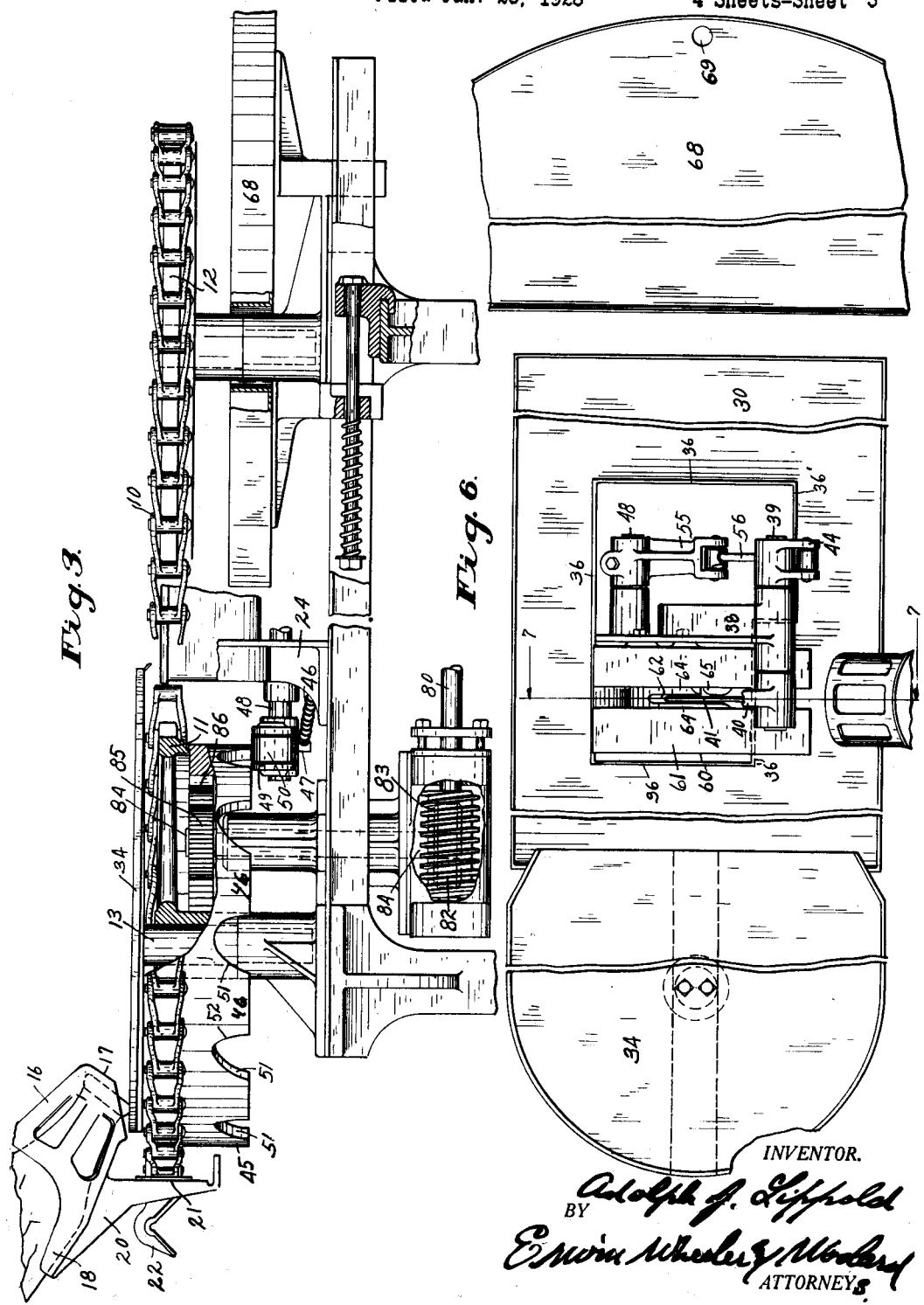

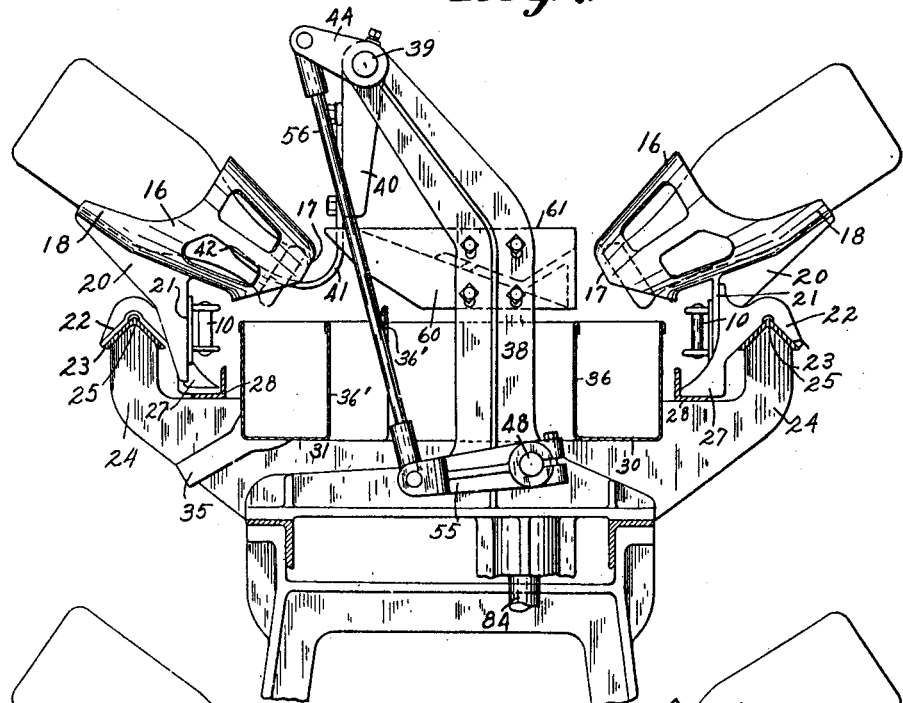
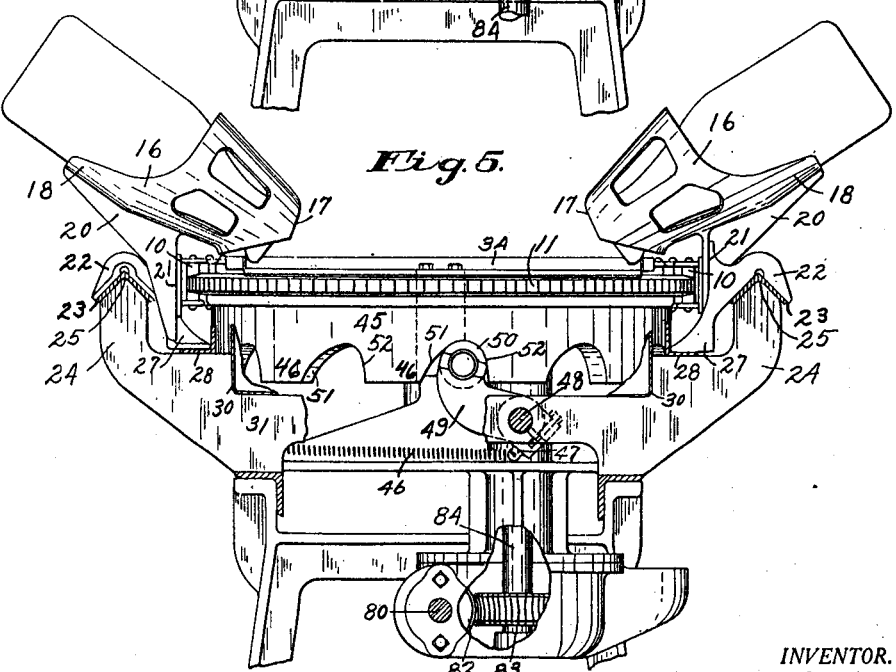

Patented Dec. 17, 1929

1,740,186

UNITED STATES PATENT OFFICE

ADOLPH J. LIPPOLD, OF MILWAUKEE, WISCONSIN, ASSIGNOR, BY MESNE ASSIGNMENTS, TO CHERRY-BURRELL CORPORATION, OF CEDAR RAPIDS, IOWA, A CORPORATION OF DELAWARE

BOTTLE-DECAPPING APPARATUS

Application filed January 28, 1928. Serial No. 250,290.

This invention relates to improvements in bottle decapping apparatus.

A primary object of this invention is to provide means for successively decapping bottles, emptying their contents, and transferring the empty bottles to cleansing means, all in a continuous operation or a series of operations continuously performed.

More specifically stated it is the object to provide means whereby bottles may be delivered successively into holders carried by an endless conveyor which holds them in a position for draining and moves them successively over a draining pan having associated therewith mechanism for removing the caps from bottles in motion, the conveyor then presenting the bottles to suitable cleansing apparatus and returning them to an unloading station, for removal,—all of said operations being performed while the conveyor is travelling at a uniform and continuous speed.

The invention contemplates the provision of means to not only facilitate the removal of caps from filled or partially filled bottles but the collection and removal of the caps, the drainage of the bottles under conditions which allow for the preservation of the contents and the subsequent transfer and presentation of empty bottles to cleansing means and their final transfer to a point of delivery whereby filled or partially filled bottles may be decapped, emptied, cleansed and delivered in a continuous succession handily, quickly and with good job results and without loss or waste of either the bottles or the contents.

In the drawings:

Figure 1 is a plan view of apparatus, embodying the invention herein described in a form particularly adapted for use in decapping, draining and rinsing milk bottles, the hood of the rinsing portion of the machine being removed to disclose the rinsing nozzles, and the hook being shown at the outer limit of its cap penetrating stroke.

Figure 2 is a side elevation with the above mentioned hood in position for use and with the hook retracted.

Figure 3 is a fragmentary view in side elevation showing portions of the driving mechanism, and also showing the actuating drum for operating the decapper in association with the capper operating, motion transmitting, crank arm.

Figure 4 is a sectional view taken on line 4—4 of Figure 2.

Figure 5 is a sectional view taken on line 5—5 of Figure 2.

Figure 6 is a plan view of the stripper in its relation to the cap receiving chute and receiving pans.

Figure 7 is a sectional view taken on line 7—7 of Figure 6.

Figure 8 is a cross section taken on line 8—8 of Figure 7.

Figure 9 is a detail view of the cap removing hook and associated bell crank arm, as seen from the outer side.

Like parts are identified by the same reference characters throughout the several views.

An endless conveyor 10 is mounted for travel in a horizontal plane about sprocket wheels 11 and 12, these wheels being supported by shafts 13 and 14 having their axes vertically disposed.

The chain is provided at spaced intervals with bottle holders 16 which are preferably of skeleton frame construction. These holders 16 are conically tapered and open ended except for a bottle retaining lip 17 which projects inwardly at the small end far enough to engage the mouth piece of a bottle along the upper side of the holder without materially obstructing the bottle mouth.

Each holder is supported from the conveyor chain 10 in an obliquely pitched position with the small end extended downwardly and inwardly. The lower side of the larger end portion has an extension 18, the inner surface of which is concavely curved in general correspondence with the curvature of the body of a bottle of the size which it is intended to receive. To connect the holder with the conveyor chain, a bracket 20 is secured to or formed integrally with the under side of the holder and its extension 18. This bracket has a vertical face 21 which is secured to the chain 10 and it also has an arm 22, which conforms to and is adapted to slide upon a trackway 23, located outwardly from the conveyor and preferably formed of angle iron supported by frame posts 24 in a position with its flanges sloping downwardly from a central ridge formed by their meeting margin 25.

The bracket 20 also has a foot piece 27 which travels along another trackway 28, located downwardly and inwardly from the conveyor and preferably formed of angle iron disposed with one flange in a horizontal plane and the other extending vertically from its inner margin. The trackways 23 and 28 extend along the conveyor stretches between the sprocket wheels and establish straight pathways of conveyor travel, both trackways being utilized to prevent sagging and lateral deflection. The vertical flange of the inner trackway 28 takes the thrust developed by torsional stress upon the chain when loaded with filled bottles. The outer trackway 23 not only furnishes a support for the conveyor and its load, but also presents transverse vibratory motion or swaying movements such as might otherwise result from cap removing operations.

A drainage pan 30 is supported by frame members 31 between the sprocket wheels. An auxiliary pan 34 is supported from the pan 30 over the sprocket wheel 11 to catch the drip from the bottles passing about this sprocket wheel, and this auxiliary pan 34 may be formed to drain into the pan 30. The pan 30 has a bottom which slopes downwardly to a drain pipe 35 (Fig. 2) through which the liquid may flow and be conducted by a hose to any suitable point of delivery.

Near the sprocket wheel 12 the pan is provided with an opening in its bottom flanged by marginal walls 36 which extend upwardly to prevent the contents of the pan from flowing through the opening. The frame is provided with an upwardly projecting post 38 which extends through said opening in the pan and a bell crank is pivoted to the upper end of this post, its pivot pin 39 being horizontally disposed and substantially parallel to the adjacent line of conveyor travel. One arm 40 of the bell crank is provided with a cap removing hook 41 having a point 42 and a barb 43. The point 42 lies in the plane in which the arm 40 swings and the barb 43 projects laterally from such plane. The other arm 44 of the bell crank constitutes the actuating arm and the hook is supported in such a position that its point may be swung into the mouth of a registering bottle far enough to penetrate a bottle cap and carry the laterally projecting barb through the cap preparatory to a retractive cap withdrawing movement. The point tends to slit the cap and the barb spreads the slit during pentration but positively engages and pulls out the cap during the retractive stroke. Both the penetrating and cap withdrawing movement may be sufficiently rapid to allow for a penetration of the cap and an immediate withdrawal of the cap from a bottle in motion thus making it unnecessary to stop the conveyor.

The cap hook bell crank is actuated in one direction from the sprocket wheel 11 through the medium of a notched drum flange or skirting 45. The projections 46 between the notches serve as actuating, or hook retracting cams, the crank being automatically actuated in the other direction by a tension spring 46 having one end connected to the frame and the other end connected to a short arm 47 of a rock shaft 48. This shaft 48 has another arm 49 provided with a roller 50 adapted to travel along the lower margin of the skirting 45 and to enter the notches therein when the roller is in registry with the notches.

It will be observed in Figure 5 that the spring 46 tends to urge the roller into the notches along the abrupt side walls 51 thereof. The opposing side wall 52 is also abruptly curved and the rotative movement of the drum flange or skirting 45 causes this wall 52 to immediately move against the roller and press it out of the notch with a cam action, thus producing a quick retractive stroke of the arm 49 and corresponding oscillation of the shaft 48 immediately following the entry of the roller into the notch.

The shaft 48 extends underneath the pan 30 to the base of the cap hook post 38 in which its other end is journaled. Near the post 38 this shaft is provided with an arm 55, which is connected by a link rod 56 with the actuating arm 44 of the cap hook bell crank. Therefore, when the shaft 48 is oscillated in one direction by the pull of the spring 46, its motion is transmitted through the arm 55 and the link rod 56 to raise the actuating arm 44 of the cap hook bell crank and swing the hook 41 downwardly and outwardly from the vicinity of the overhanging upper portion of the post 38 into the mouth of a registering bottle as illustrated in Figure 4. This movement occurs whenever a registering notch in the skirting 45 of the sprocket wheel 11 allows the roller 50 to be pulled into it by the spring 46, thereby permitting an upwardly swinging movement of the shaft arm 49. But the continued movement of the sprocket wheel thereupon carries the next cam projection 46 against the roller 50 and immediately forces its retraction, this retractive movement being transmitted through the shaft 48, arm 55 and link rod 56 to pull the cap hook bell crank arm 44 downwardly in a quick, positive stroke, which withdraws the hook from the mouth of the bottle, the laterally projecting barb positively engaging and extracting the cap.

The notches in the skirting 45 are so disposed with reference to the positions of the bottle holders on the conveyor that the cap hook will be advanced and retracted whenever a bottle is passing the plane in which the hook swings, the axis of the bottle at the time of cap penetration being nearly, or quite, coincident with said plane, and a little beyond the plane at the time of cap retraction.

To provide means for removing the caps from the hook, a relatively stationary stripper is employed. This comprises a box like structure or frame 60 (Figs. 1, 7 and 8) within which the hook may swing when advanced and retracted as above described. The end of the box through which the hook is projected is open and the top wall 61 is slotted, the margins of the slot 62 being flanged by a pair of depending partition walls or flanges 63 each of which has an inwardly projecting rib 64. The space between the ribs is wide enough to allow the shank of the hook to pass, and one of the ribs has a groove 65 extending along the line of hook travel of a sufficient depth to provide clearance for the barb 43. The lower margins of the partition flanges 63 and the lower surfaces of their inwardly projecting ribs 64 are in a common oblique plane and form an abutment against which the bottle cap A (Figs. 7 and 8) may impinge during the final portion of the retractive movement of the hook whereby the cap may be arrested and the hook pulled through it. The barb cuts its way through the material of the cap at the side of the slit originally formed by the hook when it penetrated the cap. As soon as the hook is withdrawn from the cap the latter drops through the open bottom portion of the box or frame 60.

It will be observed in Figure 1 that the stripper is located above the opening in the pan 30 which is flanked by the marginal walls 36 as above explained. The bottles are carried by the conveyor at a sufficient distance from this opening and the wall 36' over which the hook swings to prevent the milk or other contents of the bottle from discharging through the opening, the bottle being, therefore, emptied into the pan after its cap has been extracted and carried over the wall 36' to the stripper. The uncapped bottle is immediately carried by the conveyor beyond the opening in the pan and it continues to drain into the pan and into the auxiliary pan 34 while it is passing around sprocket wheel 11 and along the opposite side of the pan during its return movement.

As the bottle approaches the sprocket wheel 12 it will of course have been completely drained and it is then carried over another pan 68 having a drainage outlet 69. A supply pipe 70 preferably overhead conveys a cleansing fluid to a header 71 which partially encircles the sprocket wheel shaft 14 and is provided with a segmental row of nozzles 72, each of which, at one stage of the movement of each bottle, will be substantially aligned with the axis of the bottle. Jets of cleansing fluid may thus be delivered into the bottles while the latter are passing about the axis of the sprocket wheel 14. A hood 74 receives that portion of the fluid which fails to enter the bottles and return it to the pan 68. The fluid also drains out of the bottles into said pan and passes to the drain. Each bottle continues its movement to the loading and unloading station indicated at 75, where an operator may stand for the purpose of removing emptied and cleansed bottles from their holders and replacing them with filled capped bottles to be carried by the conveyor and presented to the hook for a cap removing operation.

To operate the conveyor, power is applied through a driving shaft 80 associated with a motor 81. The motor shaft 80 transmits motion to the sprocket wheel 11, through the worm 82, worm wheel 83, shaft 84, pinion 85, and internal gear ring 86 connected with the sprocket wheel 11.

It will be understood that with this machine, bottled milk in excess quantities may be delivered to hotels and restaurants and the unused contents returned and the milk conserved without undue expense for decapping and emptying the bottles. In fact it is possible to decap and empty bottles as fast as they can be placed upon the conveyor. The milk drained from the bottles may then be passed through a cream separator or utilized for animal feeding.

I claim:

1. Bottle decapping apparatus including the combination with a receiver for the bottle contents, of a carrier adapted to convey bottles to a position for a discharge of their contents into the receiver and a cap removing hook supported for reciprocation over one wall of the receiver for withdrawal of the bottle caps while the bottles are in such position.

2. Bottle decapping apparatus including the combination with a receiver, a carrier adapted to convey bottles to a position for a discharge of their contents into the receiver, power transmitting means for continuously moving the carrier, a cap removing hook and connections for actuating said hook into and out of the mouths of bottles and over one wall of the receiver while the latter are being conveyed by the carrier across the plane in which the hook operates, said hook being adapted to penetrate the bottle caps when moved in one direction and withdraw them from the bottles and over said wall when moved in the other direction.

3. Bottle decapping apparatus including the combination of a pivoted hook supporting arm, a hook mounted thereon and adapted to engage and remove bottle caps, a conveyor adapted to move bottles successively into and out of position for engagement and removal of their caps by said hook, and mechanical means for swinging said arm and hook for cap engaging and removing operations.

4. Bottle decapping apparatus including the combination with a container and a reciprocatory cap removing hook, power operated means for reciprocating said hook over one wall of the container, of a stripper having cap engaging members lateral to and adjacent the plane of movement of the hook on the exterior side of the container wall and against which caps carried by said hook may impinge during retractive strokes of the hook whereby the hook may be withdrawn therefrom.

5. The combination with a movable bottle support adapted to hold bottles in a draining position, of a pan into which such bottles may drain, and a reciprocatory device provided with means for moving the same across one wall of the pan into and out of the mouths of the bottles above a portion of the pan to remove the caps therefrom, and means for actuating the bottle support to carry bottles successively over the pan with their axes substantially in a plane within which the reciprocatory device moves at the end of its stroke in one direction.

6. The combination with a movable bottle support adapted to hold bottles in a draining position of a pan into which such bottles may drain, and a reciprocatory device operative into and out of the mouths of the bottles above a portion of the pan to remove the caps therefrom, means for continuously moving said support, and means for causing said cap removing device to reciprocate in synchronism with the movement of successive bottles across its field of movement.

7. The combination of a bottle cap remover, means for holding a series of bottles in a draining position in a line along one side of the cap remover, power operated means for mechanically effecting relative movement of the bottle holder and cap remover along said line to allow the cap remover to operate upon the bottle caps successively and power operated means for periodically actuating the cap remover in a plane transverse to said line and in correspondence with the time required for bringing the caps of successive bottles into registry with the cap remover, and a receptacle in position to receive liquid from the uncapped bottles.

8. The combination of an endless conveyor provided with spaced bottle rests adapted to hold bottles in a draining position, means for actuating said conveyor continuously, and a reciprocatory cap remover positioned and operative for penetration of the caps of bottles so held at intervals corresponding to the time required for the conveyor to present successive bottles to the cap remover.

9. The combination of an endless conveyor provided with spaced bottle rests adapted to hold bottles in a draining position, means for actuating said conveyor continuously, and a reciprocatory cap remover positioned and operative for penetration of the caps of bottles so held at intervals corresponding to the time required for the conveyor to present successive bottles to the cap remover, means for delivering the contents of the bottles into a receiver and means for delivering the caps at a point exterior to the receiver.

10. Bottle decapping apparatus comprising the combination of an endless conveyor, provided with bottle supports adapted to hold bottles in a draining position, a driving wheel for said conveyor, an associated wheel provided with cam projections, a reciprocatory cap remover, and motion transmitting connections actuated by said cams for operating the cap remover in timed relation to the movement of the bottles carried by the conveyor.

11. Bottle decapping apparatus comprising the combination of an endless bottle carrier adapted to carry bottles in a draining position, a pan disposed underneath the mouth portions of bottles on said carrier, a carrier actuating member provided with cam projections, a pivotally supported cap removing hook mounted for movement into and out of the mouths of bottles on the carrier, a spring for actuating the hook in one direction, and connections actuated by said cam projections for transmitting motion to the hook in the opposite direction.

12. Bottle decapping apparatus comprising the combination of an endless bottle carrier adapted to carry bottles in a draining position, a pan disposed underneath the mouth portions of bottles on said carrier, a carrier actuating member provided with cam projections, a pivotally supported cap removing hook mounted for movement into and out of the mouths of bottles on the carrier, a spring for actuating the hook in one direction, and connections actuated by said cam projections for transmitting motion to the hook in the opposite direction said cam projections being positioned to release the hook for spring actuation at intervals corresponding to the time required for successive bottles to move into positions for registry with the hook.

13. In a bottle decapping apparatus, the combintion of a bottle conveyor, and a transversely swinging cap engaging member, power driven means for actuating the conveyor to carry bottles in a draining position across the path of the cap engaging member with their caps in a position to be engaged thereby, automatic means for actuating said member for a cap engaging movement in a quick positive stroke, and mechanically operated means for retracting the cap engaging member and releasing the same for said automatic action at intervals corresponding with the time required by the conveyor for carrying successive bottles into position for cap removal.

14. In a bottle decapping apparatus, the combination of a power driven bottle conveyor provided with inclined holders formed to engage and support bottles in a draining position, and transversely movable cap engaging member, automatic means for actuating said member for a cap engaging movement in a quick positive stroke, and power driven means for retracting the cap engaging member and releasing the same for said automatic action at intervals timed in correspondence to the time required for movement of the conveyor and distance equal to that between successive bottle axes.

15. In a bottle decapping apparatus, a cap removing reciprocatory hook in combination with a laterally offset stripper provided with cap engaging members at the sides of the path of hook reciprocation, and means for reciprocating the hook in an arcuate path to and from the stripper whereby the hook may engage bottle caps during one portion of its stroke and remove the caps to the off-set stripper for cap stripping operation out of line with the discharging contents of the bottle.

16. In a bottle decapping apparatus, a cap removing reciprocatory hook in combination with a stripper provided with cap engaging members at the sides of the path of hook reciprocation, a pan underneath the path of the hook at the side of the stripper from which the hook point advances for cap engagement and means for successively presenting capped bottles positioned for drainage into said pan with their caps in position for engagement by said hook when the latter is reciprocated.

17. In a bottle decapping apparatus the combination of a liquid collecting pan, an auxiliary pan arranged to drain into one end thereof, and a third pan at the other end thereof associated with a set of nozzles adapted for upward delivery of a cleansing fluid and covered by a hood, a conveyor provided with bottle supports adapted to convey the supported bottles along the sides of said pans in positions for drainage therein, and a cap remover associated with the first mentioned pan and adapted to successively remove caps from bottles carried by the conveyor along the side of said pan.

18. In a bottle decapping apparatus, provided with a bottle conveyor, and a conveyor actuating sprocket wheel, the combination of a cap remover associated with the conveyor and adapted to engage and remove caps laterally carried by the conveyor, a cap remover actuator associated with said sprocket wheel and a receiver for the contents of the uncapped bottles, said conveyor being adapted to position the bottles for discharge into said receiver.

19. In a bottle decapping apparatus provided with an endless bottle conveyor adapted to hold bottles in a draining position, a bottle decapper located at one side of the line of conveyor travel in one direction and adapted to engage and remove caps from passing bottles on the conveyor, a pan positioned underneath the mouths of bottles passing the decapper to receive the contents of the uncapped bottles, and means for actuating the decapper to remove caps laterally across the margin of said pan and out of line with the discharging contents of the bottles.

20. In a bottle decapping apparatus the combination of a bottle conveyor provided with bottle holders and adapted to convey bottles in a draining position, a reciprocatory cap removing hook provided with a cap engaging barb, means for driving the point and barb of the hook through the cap of a registering bottle on the conveyor, a set of thrust receiving and load carrying trackways associated with the conveyor, and supporting brackets associated with the bottle holders and adapted for travel along said trackways.

21. The combination with an endless bottle carrier provided with spaced holders, each having an inclined supporting surface for the body of a bottle and a stop for preventing the bottle from sliding downwardly along said inclined surface, means for continuously actuating said carrier, a cap remover located at one side of the carrier and provided with a reciprocable cap engaging member movable transversely of the line of carrier movement and means for periodically reciprocating the said cap removing member at intervals corresponding to those required by the conveyor for movement equal to the distance between the spaced bottle holders.

22. Bottle decapping apparatus including a cap removing hook having a point, a laterally projecting barb and an arcuately curved shank, means for supporting said hook for swinging movement about an axis substantially perpendicular to a plane which includes the shank axis and point, said hook being normally suspended below said axial support whereby it may be swung laterally and upwardly to project the point and barb through the cap of a partially inverted bottle, and whereby it may be reversely actuated to withdraw the cap from the bottle and from the path of its contents.

23. In a bottle decapping apparatus the combination with a pan for receiving the contents of the bottles and a holder for supporting bottles in a draining position, of a cap remover located at one side of the pan and provided with means for reciprocating it across the margin of the pan to engage and remove caps from bottles supported by said holder.

24. Bottle decapping apparatus including the combination with a pan having an opening in its bottom flanked by marginal walls, a bottle carrier located adjacent said pan adapted to convey bottles along said pan, in a position to discharge their contents, means on said carrier for holding bottles in an inclined position and cap removing mechanism having operating connections extending through said opening; said mechanism being adapted to remove caps from bottles presented by said carrier and deliver them from said opening.

25. Bottle decapping apparatus including the combination with a pan having an opening in its bottom flanked by marginal walls to prevent escape of liquid from the pan through said opening, a bottle cap remover supported above said opening and reciprocable laterally over a portion of the pan at one side thereof, a bottle carrier, power operated means for actuating said carrier over the pan to successively convey bottles over the pan and to carry thir capped ends across the path of the cap remover mechanism for cap removal, and a stripper in the path of and cooperative with the cap remover above said opening to cause the removed caps to drop through said opening.

26. Bottle decapping apparatus including the combination of a receiver, a post extending upwardly adjacent to one wall of the receiver, a reciprocatory cap removing device carried by the post, means for periodically reciprocating said device over said wall and a conveyor extending over the reservoir for presenting the capped ends of bottles in the path of said device for cap removal and drainage into the receiver.

ADOLPH J. LIPPOLD.